United States Patent [19]
Meunier et al.

[11] Patent Number: 6,134,527
[45] Date of Patent: Oct. 17, 2000

[54] METHOD OF TESTING A VOCABULARY WORD BEING ENROLLED IN A SPEECH RECOGNITION SYSTEM

[75] Inventors: Jeffrey Arthur Meunier, Chicago; Edward Srenger, Schaumburg; Steven Albrecht, Glenview, all of Ill.

[73] Assignee: Motorola, Inc., Schaumburg, Ill.

[21] Appl. No.: 09/016,012

[22] Filed: Jan. 30, 1998

[51] Int. Cl.$^7$ ................................................ G10L 17/00
[52] U.S. Cl. ..................... 704/247; 704/240; 704/243; 704/241; 704/239
[58] Field of Search ................................. 704/240, 243, 704/251, 256, 257, 241, 239, 247

[56] References Cited

U.S. PATENT DOCUMENTS

| | | | |
|---|---|---|---|
| 4,713,777 | 12/1987 | Klovstad et al. | 364/513.5 |
| 4,713,778 | 12/1987 | Baker | 364/513.5 |
| 4,718,088 | 1/1988 | Baker et al. | 704/240 |
| 4,718,092 | 1/1988 | Klovstad | 704/240 |
| 4,718,093 | 1/1988 | Brown | 704/243 |
| 4,903,305 | 2/1990 | Gillick et al. | 704/240 |
| 5,664,058 | 9/1997 | Vysotsky | 704/243 |
| 5,732,187 | 3/1998 | Scruggs et al. | 704/251 |
| 5,862,519 | 1/1999 | Sharma et al. | 704/231 |

*Primary Examiner*—David R. Hudspeth
*Assistant Examiner*—Vijay B. Chawan
*Attorney, Agent, or Firm*—John J. King; Daniel Collopy

[57] ABSTRACT

A method of testing a new vocabulary word is performed using any set of enrollment utterances provided by the user or from an available database. The present method preferably does not use separate training and similarity test utterances. This allows any or all available repetitions of a vocabulary word being enrolled to be used for training (204), therefore improving the robustness of the trained models. Likewise, any or all training repetitions can also be utilized for similarity analysis (212), providing additional test samples which should further improve the detection of acoustically similar words. Additionally, the similarity analysis progresses incrementally and does not need to continue if a confusable word is found. Finally, first and second thresholds could be employed (212, 302) to provide greater flexibility for a user training a speech recognition system.

5 Claims, 4 Drawing Sheets

METHOD OF TESTING A VOCABULARY WORD BEING ENROLLED IN A SPEECH RECOGNITION SYSTEM

FIELD OF THE INVENTION

This application is related to speech recognition, and more particularly to a method for training models for a speech recognition system.

BACKGROUND OF THE INVENTION

In a speaker dependent speech recognition system, users need to enroll the vocabulary words that they wish to have available when using the system. A vocabulary "word" can be a single spoken word or a short phrase, and the vocabulary words chosen depend on the particular application. For example, a speech recognition implementation for a portable radiotelephone might require the user to provide the names and locations of frequently called people (e.g., "Fred's office"), or commands for frequently used features usually available in a user interface (e.g., "battery meter", "messages", or "phone lock"). The choice of vocabulary words is unsupervised and left to the user, allowing the entry of easily remembered words or phrases.

Unfortunately, the choice of these vocabulary words can have a significant impact on the performance of a speech recognition system. Allowing too much flexibility to an inexperienced user may result in a number of potential problems. If the user inadvertently selects two acoustically similar vocabulary words to identify two distinct entries, poor recognition performance may result, especially when the recognition task is performed in a noisier environment. As an example, for the aforementioned portable radiotelephone speech recognition application, this could happen if the user decides to enroll "Fred's Office" and "Ted's Office." Similarly, since most speaker dependent systems allow the user to incrementally enroll words into their vocabulary, there is a danger of mistakenly re-enrolling the same word with a different association. Again, in the context of a radiotelephone speech recognition application, the user could enroll the phrase "Fred's Office" for two separate people named Fred. In such cases, it would be beneficial to detect similarities between these voice-tags at the time of the second word's enrollment and provide the user with some type of warning of this similarity. The user should then be encouraged to choose a different, more unique entry or voice-tag.

A similar problem also exists while selecting speaker independent vocabularies. For example, in command and control applications, during recognition a number of words are "active," and the user is making a selection by saying one of these active words. The ability of the speech recognizer to accurately discriminate between these words depends, to some extent, on the words themselves and their similarity to one another. The designer of such a command and control vocabulary, in the event a number of possible alternatives for a given word are available, would want to reject any alternatives that were too similar to other vocabulary words in the interest of improving system performance. Therefore, use of such a similarity detection technique would be useful during the design of speaker independent systems as well.

Ensuring the uniqueness and minimizing confusion of the enrolled vocabulary words becomes even more critical during recognition in acoustically noisy environments, such as in an automobile or where background conversation is present. In such environments, the recognizer's ability to distinguish between acoustically similar tags can be greatly reduced. Therefore, failing to encourage the enrollment of acoustically distinct vocabulary words could severely limit the performance achievable in such environments. By testing for word similarity during vocabulary enrollment, one can reduce the likelihood of certain types of recognition errors and minimize user annoyance.

Prior art methods have been proposed for preventing the enrollment of acoustically similar vocabulary words, but these methods rely on collecting additional repetitions of the word being trained for the sole use of similarity testing. According to these conventional methods, the user is prompted during enrollment to say the utterance he or she wishes to enroll at least two times. The first repetition is used to create a model of the new word. A model is a representation used by a speech recognition system for an enrolled word or phrase. This representation can take many forms, including a conventional template as used in recognition systems based on dynamic time warping (DTW), a statistical representation as used by systems based on hidden Markov model (HMM) techniques, or a set of weights used to characterize a multilayer artificial neural network. This new model and all previously enrolled word models are then pooled together to form the recognition vocabulary that needs to be evaluated for similarity. The second repetition is then used only as a test utterance, evaluating the new model just trained against any words already enrolled into the vocabulary to identify a potential acoustic similarity. If this test is successful, the new word is enrolled into the vocabulary. If the test is failed, the new word is rejected. Accordingly, this type of method is limited by the fact that each utterance is designated as either a training repetition or a similarity test repetition. No additional benefit is derived from the similarity test utterance when training the new model, and the training utterance is not made available during similarity analysis for further testing. Prior art methods also compare the newly enrolled word with all other words in the vocabulary by performing a time synchronous Viterbi-type search over the whole vocabulary, which is time consuming and computationally intensive.

Accordingly, there is a need for a method that can detect when new vocabulary words are acoustically similar to previously enrolled words, taking full advantage of all available data and completing any analysis with as little delay as possible.

SUMMARY OF THE INVENTION

In accordance with one aspect of the present invention, a method of testing a vocabulary word being enrolled in a speech recognition system for acoustic similarity with previously enrolled words comprises at least three steps. First, a speech utterance of the vocabulary word to be enrolled is received during an enrollment procedure. Then, a new model is trained based upon the speech utterance. And finally, the new model is analyzed for acoustic similarity with the previously enrolled words.

DESCRIPTION OF THE PREFERRED EMBODIMENTS

A method of testing a new vocabulary word being enrolled for acoustic similarity with existing vocabulary words in a speech recognition system is disclosed. During a speaker dependent enrollment procedure, the user provides one or more repetitions of the speech utterance to be enrolled. In the case of speaker independent model training, a database of multiple repetitions of the word being trained is available. Using these repetitions, two tasks must be accomplished: training of a model of the word, and analysis of the new word for similarity to existing vocabulary words. The model for the word being enrolled is created first. The similarity detector then uses the new model, the previously trained models, and one or more of the new word's enrollment repetitions, to determine whether the new model is confusingly similar to an existing model.

To this end, the present method creates two subsets of enrollment utterances from the set of all N enrollment utterances $S_N$. The first subset, $S_J$, consists of J word repetitions to be used for model training. The second subset, $S_K$, consists of K repetitions to be used for similarity analysis. The formation of these subsets is not restricted in any way. Therefore, they can be mutually exclusive, partially overlapping, or fully overlapping with one another. Furthermore, each of the sets can include some or all of the provided repetitions (i.e., $J \leq N$ and $K \leq N$), such that both the model training procedure and the similarity analysis procedure utilize the most appropriate inputs for the given task.

Once model training is complete, the similarity analysis procedure proceeds in an incremental fashion. Models for each of the previously trained vocabulary words are considered one at a time, as opposed to evaluating all existing models in parallel, as is usually done in conventional speech recognition systems. If all models were being searched in parallel, detection of a confusable word would only be possible after the full analysis was complete. Since the similarity analysis in the present invention progresses incrementally, the process does not need to continue if a confusably similar word is found. This reduces the delay experienced by the user during the model training phase if a word is rejected early on in the analysis.

Further reduction in delay can be achieved by ordering the enrolled words by a rough measure of similarity to the new word, such as by a difference in word durations. In this way, the first words analyzed are more likely to cause a rejection of the new word, allowing an earlier exit from the analysis. Therefore, the system is able to respond to the user more quickly, reducing the total transaction time. In the event the new word is too similar to a previously enrolled word, the user can then be encouraged to choose an alternate word or phrase.

Figure 1:
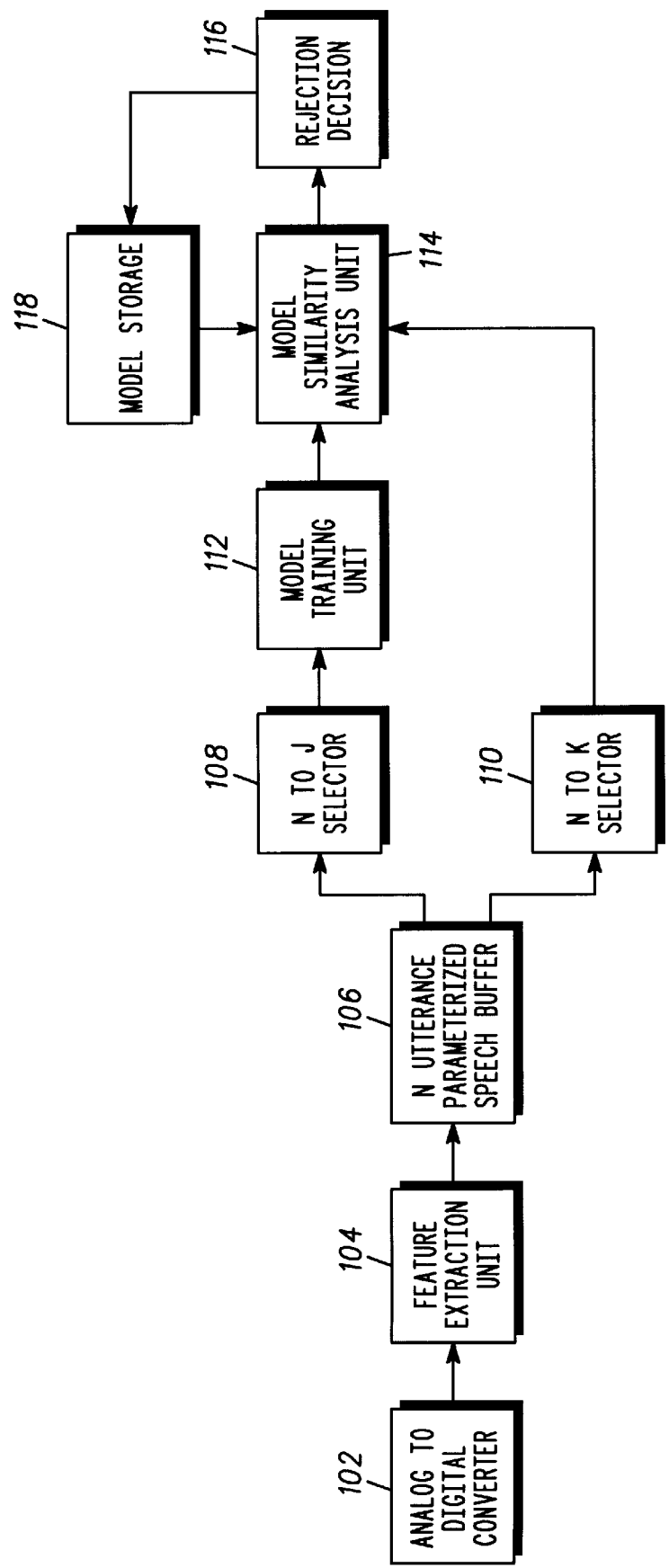
FIG. 1 is a functional block diagram for training words used in a voice recognition system according to the present invention.

Turning now to FIG. 1, a functional block diagram shows the blocks for model training and similarity analysis according to the present invention. Such blocks could be implemented in a digital signal processor or some other suitable circuit. An analog-to-digital converter 102 generally receives an analog voice input from a user and provides a digital output to a feature extraction unit 104. The feature extraction unit calculates parameters from the sample data that characterize the speech utterance, such as any of the multitude of spectrally derived features. The characterizing parameters are input to a speech buffer 106 for maintaining these parameters for a number of utterances.

The speech buffer 106 is coupled to an N-to-J selector 108 and an N-to-K selector 110. The N-to-J selector 108 generally receives parameters for a set of utterances $S_J \subseteq S_N$, which are to be used in a training procedure and are input to a model training unit 112. The N-to-K selector 110 receives parameters for a set of utterances $S_K \subseteq S_N$, which are used for determining whether the new utterance should be rejected. The sets $S_J$ and $S_K$ can be mutually exclusive, partially overlapping, or fully overlapping.

In one preferred embodiment, all word repetitions provided by the user are used for both model training and similarity analysis (i.e., $S_N = S_J = S_K$). This allows all available repetitions of the new vocabulary word to be used for training, which improves the robustness of the model trained. Likewise, all training repetitions are utilized for similarity analysis, providing additional test samples that should further improve similarity detection performance.

In another preferred embodiment, information collected during the capture of each word repetition is used by a set partitioning heuristic that creates two different subsets $S_J$ and $S_K$. In this manner, utterances that are sensed to be unsuitable for either training or similarity analysis can be eliminated from that procedure. For example, when training a new model, the system may require the user to input three utterances for a particular new vocabulary word. If one of the utterances is severely corrupted by background noise, the system may choose not to train with the corrupted utterance in order to improve the robustness of the resulting model. However, the system may choose to include this utterance during similarity analysis, since background noise may commonly be present when using the recognizer after it is trained, resulting in worse performance. Analyzing the confusability of the trained vocabulary under such real-world conditions allows the system to foresee potential problems and warn the user accordingly.

The outputs of the model training unit 112 and N-to-K selector 110 are input to the model similarity analysis unit 114. The operation of the model similarity analysis unit will be described in more detail in reference to the remaining figures. Based on the outcome of the similarity analysis, a decision whether to enroll or discard a new word is made at block 116. If the new word is accepted, models for the new word are then stored in the model storage block 118. The models stored in the model storage block 118 are then used by the model similarity analysis unit 114 during subsequent new vocabulary word analyses when the system is in training mode, as well as by the recognizer when the system is in recognition mode.

Figure 2:
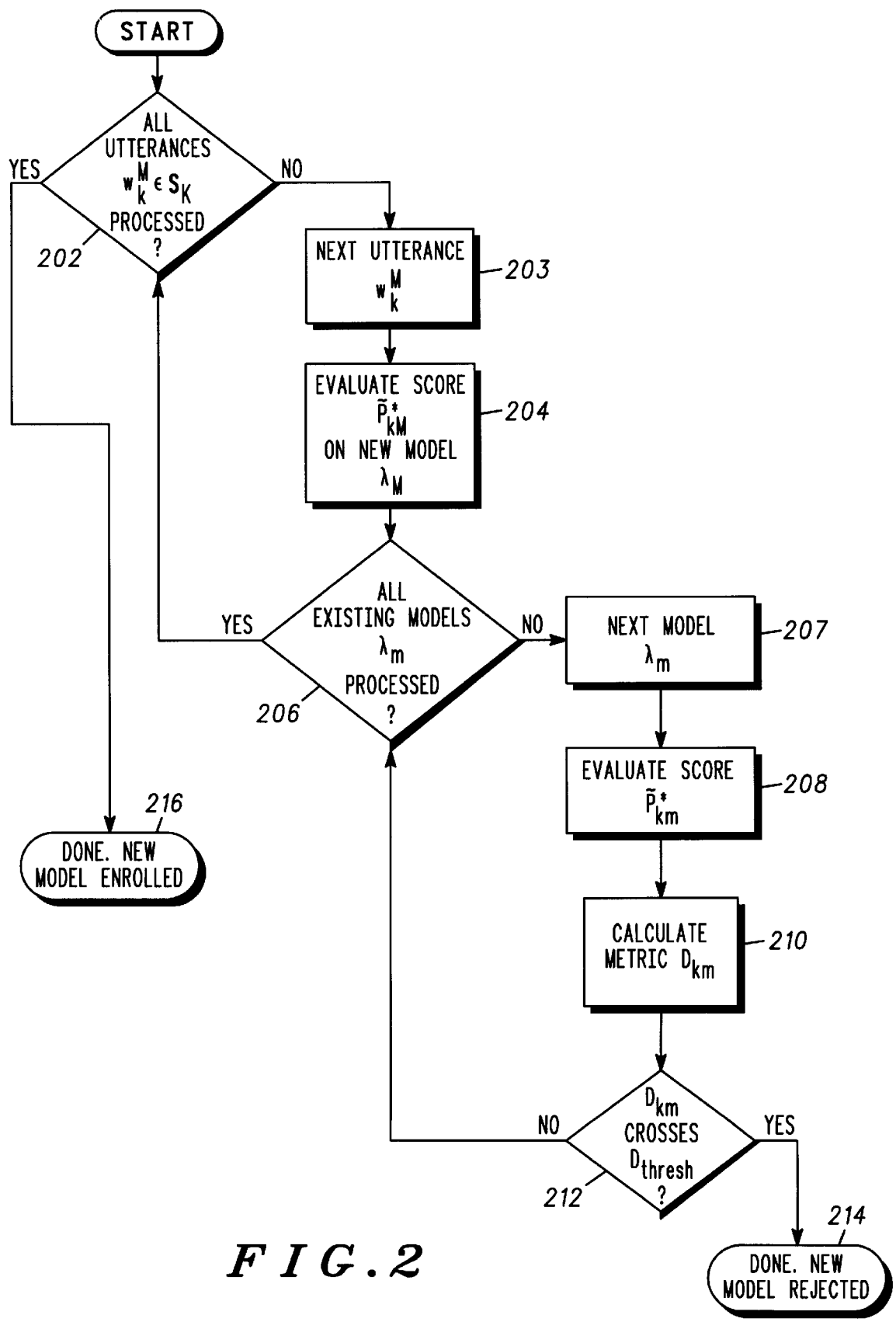
FIG. 2 is a flow chart showing the steps for training a voice recognition system according to the present invention.

Turning now to FIG. 2, a flow chart shows the model similarity analysis according to the first embodiment of the present invention. A similarity analyzer checks if each similarity analysis test utterance $W_k^M \in S_K$ has been processed at a step 202, and if not receives the next test utterance at step 203. A reference score $\tilde{P}^*_{kM}$ on a new model $\lambda_M$ is obtained, using Viterbi alignment or a comparable method, at a step 204. Whether all previously trained models have been analyzed is checked in step 206, and if not the similarity analyzer begins processing the next one in step 207. A score $\tilde{P}^*_{km}$ is obtained for the previously trained model $\lambda_m$, also using Viterbi alignment or a comparable method, at a step 208. The system then calculates a metric $D_{km}$ at a step 210. The calculation of the metric will be described in more detail in reference to FIG. 4. If the metric crosses an empirically determined threshold $D_{thresh}$ at step 212, then the new vocabulary word represented by the new model $\lambda_M$ is said to be acoustically similar to the previously trained word represented by the model $\lambda_m$. The new word is then rejected at a step 214. It should be noted that the value $D_{thresh}$ is not necessarily fixed, and could be adapted depending on the environment in which a user is detected to be speaking. Otherwise, the utterance is compared against each of the remaining models until the threshold is crossed or until all previously trained models have been checked. Then, analysis continues on to the next similarity test utterance $W_k^M$. Analysis is complete when either the threshold is crossed or when all utterances have been compared against all models. If each utterance is compared against each model, and none of the calculated metrics $D_{km}$ crosses the threshold $D_{thresh}$ resulting in rejection, the new model is enrolled at a step 216.

The analysis of utterances preferably proceeds in an incremental fashion. Since the similarity criterion is met if the threshold is crossed for any word $w_k^M$ and any model $\lambda_m$, the values of $D_{km}$ do not need to be to be calculated for all words $\{w_0^M, L, w_{K-1}^M\}$ and all models $\{\lambda_0, L, \lambda_{M-1}\}$ in the event of a rejection. This reduces the total time needed to verify a new model, compared to other techniques that require consideration of all models before making a decision. If minimizing training time is not a priority, and all values of $D_{km}$ can be calculated, these scores provide other useful information. For instance, models trained from speech utterances of poor quality are often associated with values of $D_{km}$ that consistently cross or are close to crossing the threshold $D_{thresh}$ during subsequent similarity analyses. Therefore, by maintaining statistics on the observed values of the metric for each model, models lacking robustness can be identified. In one embodiment, the user is then simply warned of the condition and advised to retrain or delete the questionable model. Alternatively, the system retrains the model automatically, either using a supervised adaptation procedure where the user is explicitly prompted for new repetitions of the word, or using an unsupervised procedure where word repetitions said by the user during recognition are used without their explicit knowledge to update the model.

Figure 3:
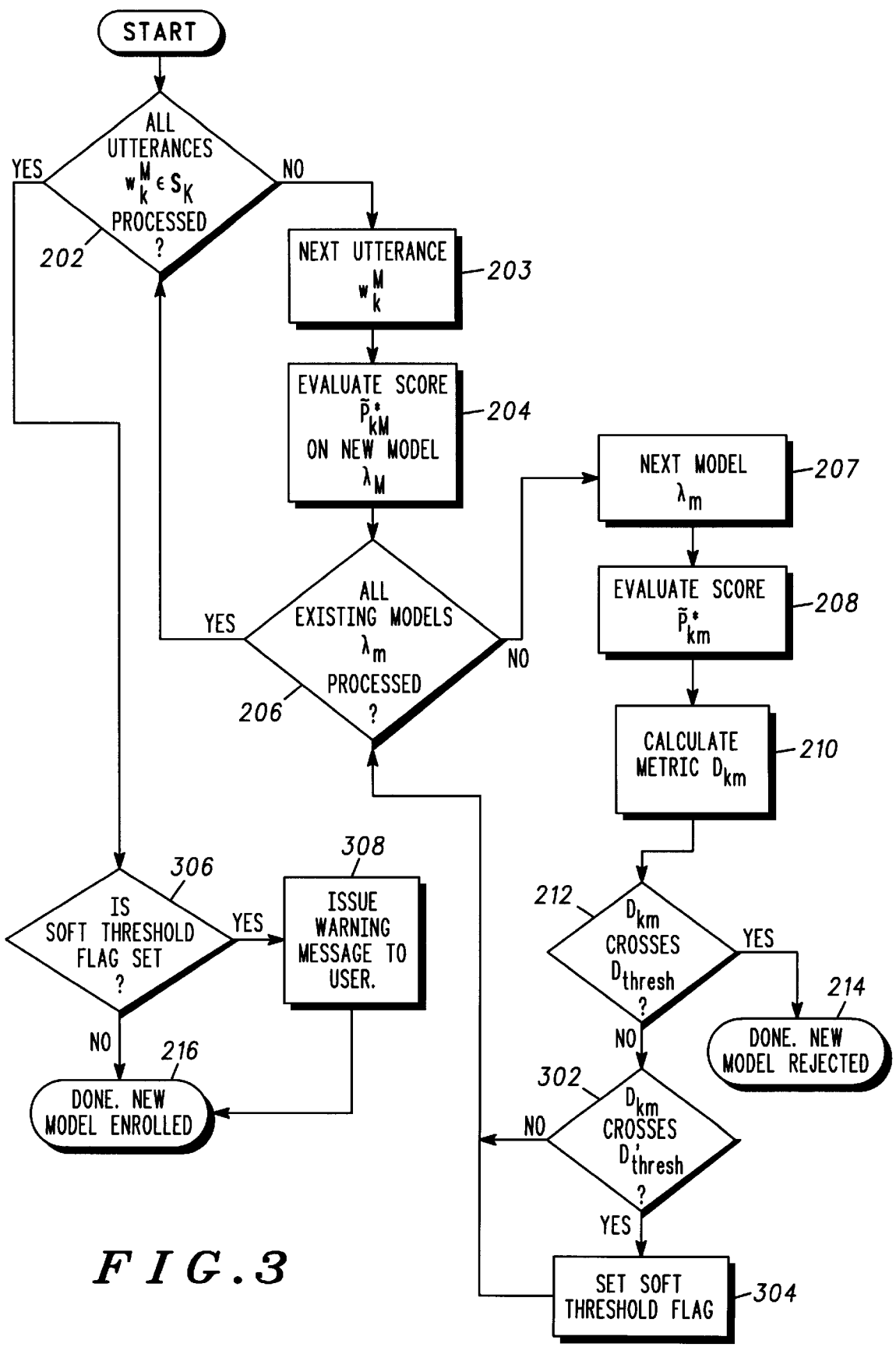
FIG. 3 is a flow chart showing the steps for training a voice recognition system according to an alternate embodiment of the present invention.

Turning now to FIG. 3, a flow chart shows an alternate embodiment for model similarity analysis having soft thresholding according to the present invention. A secondary threshold $D'_{thresh}$ is defined, and a subsequent test is performed to check whether this secondary threshold is crossed. The threshold values $D_{thresh}$ and $D'_{thresh}$ are chosen such that a range of values representing moderate confusability is delimited. In such moderate cofusability situations, refusing to enroll the new vocabulary word might be perceived by the user as limiting. The user can instead be warned of potential similarity and be given the choice of enrolling the new word or providing an alternative phrase.

To add this flexibility, additional steps can be added to the flow chart of FIG. 2. After determining that a metric $D_{km}$ does not pass the first threshold $D_{thresh}$ at a step 212, the system determines whether the metric crosses the secondary, less strict threshold $D'_{thresh}$, at a step 302 according to the alternate embodiment of FIG. 3. If the metric crosses that secondary threshold, the system sets a soft threshold flag at a step 304 and proceeds with the similarity analysis. (This is in contrast to the test against the hard threshold $D_{thresh}$ at step 212, where passing the threshold halts further analysis.) In the event that, comparing each utterance to each existing model, the metric does not pass the hard threshold for any pair, the system determines whether a soft threshold flag is set at step 306. If the flag is set, a warning message is issued to the user at a step 308. This allows the analysis unit to issue a more benign recommendation to the user when the results are less conclusive, providing the user with the information needed to correct the problem if they see fit.

Figure 4:
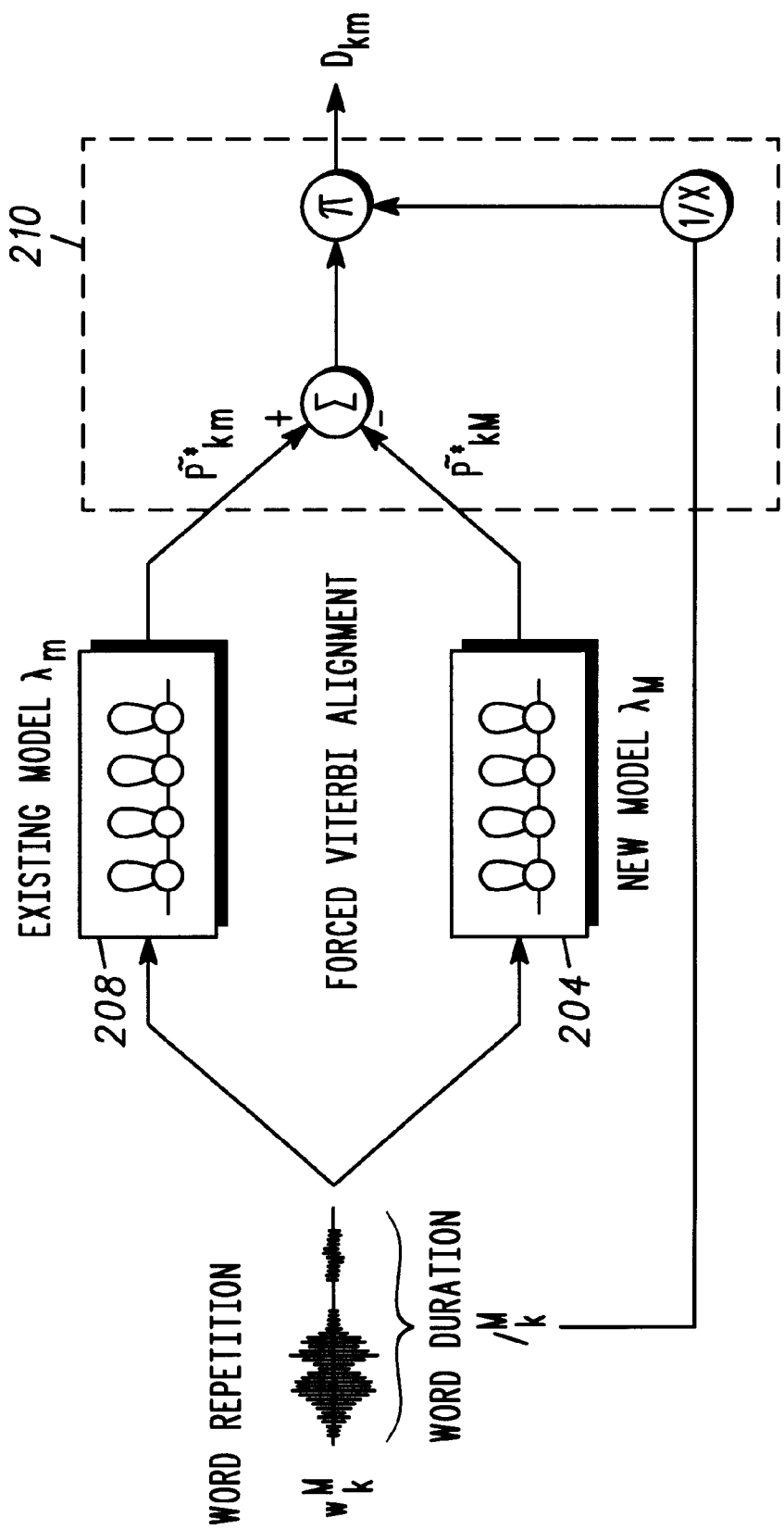
FIG. 4 is a functional block diagram showing a similarity metric calculation used during model similarity analysis according to the present invention.

Turning now to FIG. 4, a more detailed illustration of the metric calculation is shown. Using standard forced Viterbi alignment or a comparable method, a score can be computed corresponding to the best forced alignment of a word repetition over a model. Most often, this score takes the form of a log likelihood. However, the method that follows could be modified by anyone skilled in the art to accommodate many other types of score, such as non-logarithmically based likelihoods or distortion-based metrics.

As is shown in FIG. 2 and FIG. 3, alignment of a test word over a new model is performed in step 204 to generate a reference score $\tilde{P}^*_{kM}$. Then, using the same technique, the log likelihood score $\hat{P}^*_{km}$ is calculated on an existing word model in step 208. The forced alignment over each existing model is calculated individually, in contrast to the calculation typically performed during word recognition where all models are searched simultaneously for the best path. Other than this procedural difference, the alignment performed for similarity analysis is preferably made to mimic the alignment done by the decoder used during recognition. (For example, in embodiments utilizing hidden Markov model techniques, by including techniques such as the evaluation of state duration constraints and by using different parameter weighting factors, the scores generated are made more indicative of those observed during recognition.) In the event a valid segmentation of a test utterance over a model does not exist, the metric is incalculable and is removed from further analysis by setting $D_{km}=-\infty$. If both alignments are performed successfully, the metric is then calculated in step 210. This is done by forming the frame normalized score difference between the log likelihood scores $\hat{P}^*_{kM}$ and $\tilde{P}^*_{kM}$. First, the difference of the two scores is calculated. Then, in order to form a metric independent of test utterance length, the difference is normalized by the word duration $l_k^M$ (measured in short-time spectral analysis frames) to get the final metric $D_{km}$. The calculated metric is then crossed on to step 212 and subsequent steps.

In summary, a method of testing a new vocabulary word being enrolled for acoustic similarity with existing vocabulary words in a speech recognition system is disclosed. Analysis is performed from available repetitions of the new word being enrolled. Once this analysis is performed, a warning can be issued by the system if the new word is too similar to a previously enrolled word, and an alternate word or phrase can then be chosen. The present method does not use separate training and similarity test utterances. This allows any available repetitions of a vocabulary word being enrolled to be used for training, and therefore improves the robustness of the models trained. Likewise, any word repetitions can also be utilized for similarity analysis, providing an optimal set of test utterances that should further improve detector performance. Additionally, the similarity analysis progresses incrementally and does not need to continue if a confusable word is found. This reduces the delay experienced by the user during the model training phase if a word is rejected early on in the analysis.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable cellular radiotelephones, the invention could be applied to any device employing speech recognition, including pagers, electronic organizers, computers, and telephony equipment. Applicants' invention should be limited only by the following claims.

We claim:

1. A method of testing a vocabulary word being enrolled in a speech recognition system for acoustic similarity with previously enrolled words, said method comprising the steps of:
   receiving a first repetition and a second repetition of a speech utterance to be enrolled during an enrollment procedure;
   after receiving said first repetition and said second repetition of said speech utterance, training a new model based upon said speech utterance using said first repetition of said speech utterance; and
   after receiving said first repetition and said second repetition of said speech utterance, analyzing said new model for acoustic similarity with previously enrolled words by analyzing said second repetition of said speech utterance.

2. A method of testing a vocabulary word being enrolled in a speech recognition system for acoustic similarity with previously enrolled words, said method comprising the steps of:
   receiving a single occurrence of at least one speech utterance to be enrolled during an enrollment procedure;
   training a new model based upon said at least one speech utterance using said single occurrence of said at least one speech utterance;
   calculating a metric comprising a frame normalized score difference between said new model and an existing model corresponding to a previously enrolled word;
   setting a first threshold on said metric;
   rejecting said new model if said first threshold is crossed;
   informing the user of acoustic similarity; and
   presenting the user with an option of choosing an alternate speech utterance.

3. A method of testing a vocabulary word being enrolled in a speech recognition system for acoustic similarity with previously enrolled words, said method comprising the steps of:
   receiving repetitions of a speech utterance of the vocabulary word to be enrolled during an enrollment procedure;
   training a new model based upon said speech utterance; and
   analyzing said new model for acoustic similarity with said previously enrolled words, wherein said step of analyzing comprises:
     calculating a metric between said new model and an existing model corresponding to a previously enrolled word;
     setting a first threshold based on said metric;
     incrementally analyzing each of said repetitions of said speech utterance; and
     terminating said step of analyzing before completion in the event that said first threshold is crossed.

4. The method of testing a new vocabulary word of claim 3 wherein said step of analyzing is performed in an order whereby those steps most likely to result in early termination are performed first.

5. A method of testing a vocabulary word being enrolled in a speech recognition system for acoustic similarity with previously enrolled words, said method comprising the steps of:
   receiving repetitions of a speech utterance of the vocabulary word to be enrolled during an enrollment procedure;
   training a new model based upon said speech utterance; and
   analyzing said new model for acoustic similarity with said previously enrolled words, wherein said step of analyzing comprises:
     calculating a metric between said new model and an existing model corresponding to a previously enrolled word;
     setting a first threshold based on said metric;
     setting a second threshold based on said metric;
     incrementally analyzing each of said repetitions of said speech utterance;
     providing a warning to a user of a speaker dependent voice recognition system if said second threshold is crossed; and
     terminating said step of analyzing before completion in the event that said first threshold is crossed.

* * * * *